United States Patent [19]

Kielczewski

[11] Patent Number: 4,613,151

[45] Date of Patent: Sep. 23, 1986

[54] HIGH/LOW EXTENSION-LIFT POWER WHEELCHAIR

[76] Inventor: William J. Kielczewski, 9123 Beaudry St., Duluth, Minn. 55808

[21] Appl. No.: 580,739

[22] Filed: Feb. 16, 1984

[51] Int. Cl.[4] .............. B62D 63/02

[52] U.S. Cl. .............. 280/650; 180/68.5; 180/216; 180/907; 280/62; 280/242 WC; 280/657

[58] Field of Search .............. 180/907, 906, 68.5, 180/6.5, 216; 280/242 WC, 647, 657, 289 WC, 62; 296/65 R; 414/921

[56] References Cited

U.S. PATENT DOCUMENTS

| | | | |
|---|---|---|---|
| 3,111,181 | 11/1963 | Yatich | 180/907 |
| 3,882,949 | 5/1975 | Anderson | 280/650 |
| 4,335,900 | 6/1982 | Fleischer | 280/650 |
| 4,493,488 | 1/1985 | Panaia et al. | 280/650 |

FOREIGN PATENT DOCUMENTS

| | | | |
|---|---|---|---|
| 577051 | 5/1946 | United Kingdom | 280/650 |
| 2048791 | 12/1980 | United Kingdom | 280/242 WC |
| 2078176 | 1/1982 | United Kingdom | 280/242 WC |

*Primary Examiner*—John J. Love
*Assistant Examiner*—Eric Culbreth
*Attorney, Agent, or Firm*—Alan G. Greenberg

[57] ABSTRACT

This invention relates to an improved wheelchair adapted to provide enhanced mobility for the occupant together with making ground level activities available. The wheelchair comprises a main frame together with an extension frame telescopically secured to said main frame. A seat is operably secured to the extension frame so that when the extension frame is moved away from the main frame, the seat is lowered, and when said extension frame is brought back to said main frame, the seat is raised. Means are provided for further enhancing stability in the form of a mechanism to selectively move the drive wheels apart for wider wheel tracking. A rear wheel castered to the extension frame is provided with a selectively operable torsion limiter.

17 Claims, 13 Drawing Figures

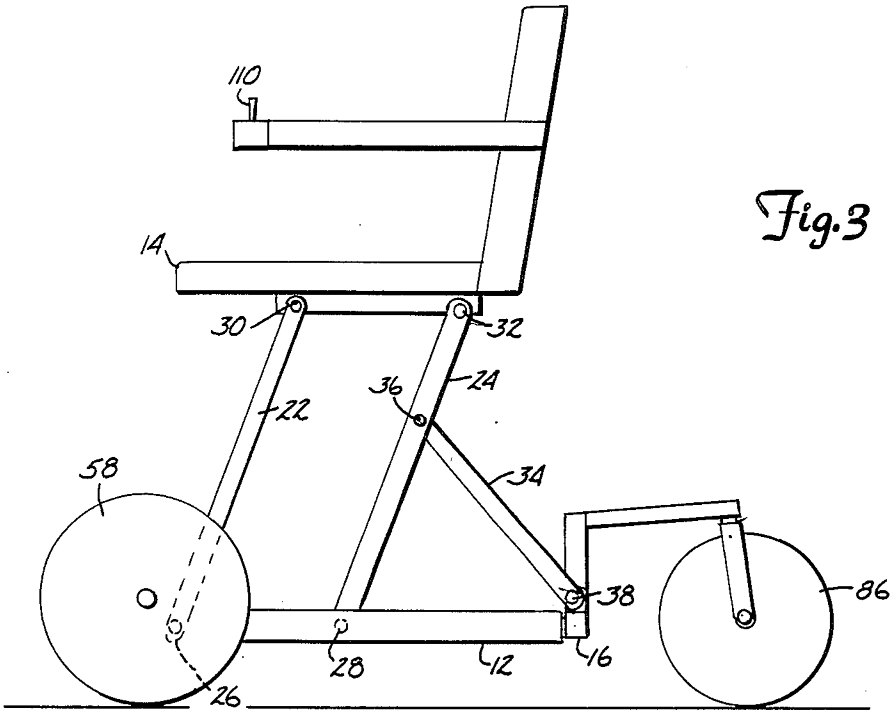
Fig.3
Fig.4
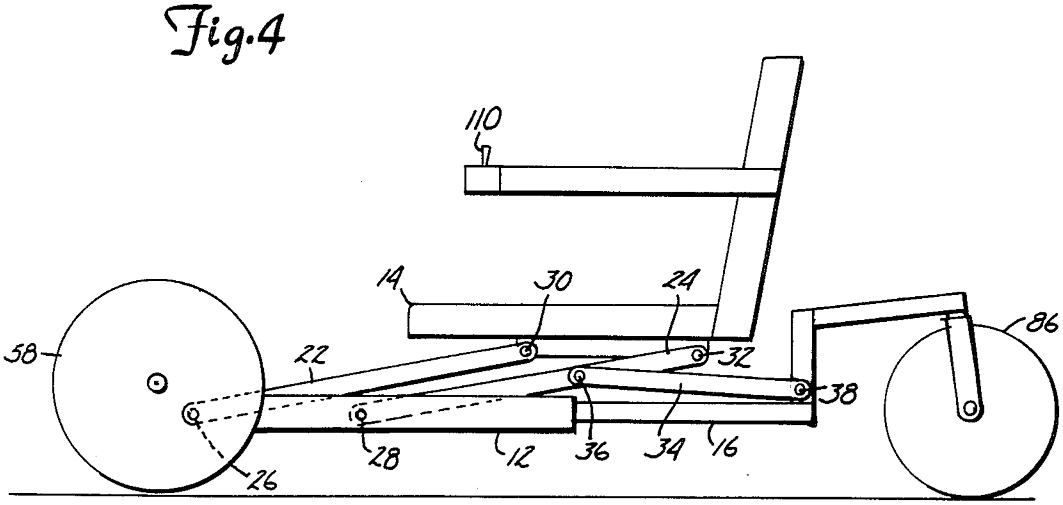

Fig. 8
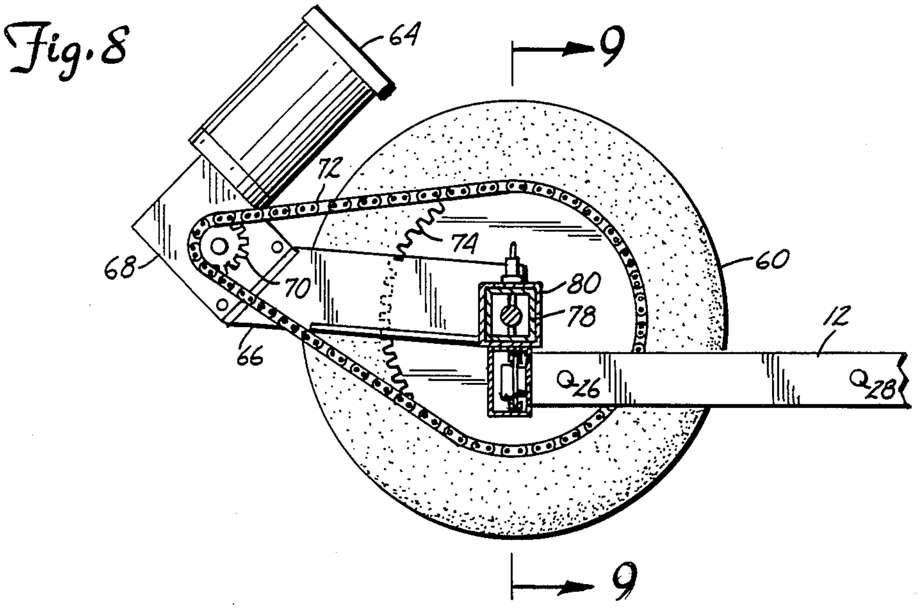
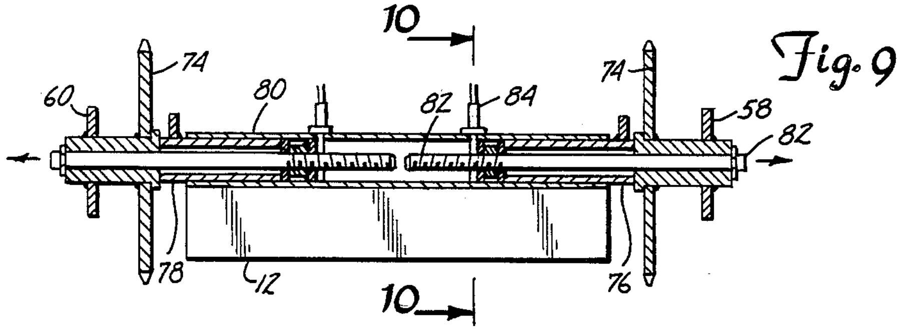
Fig. 9
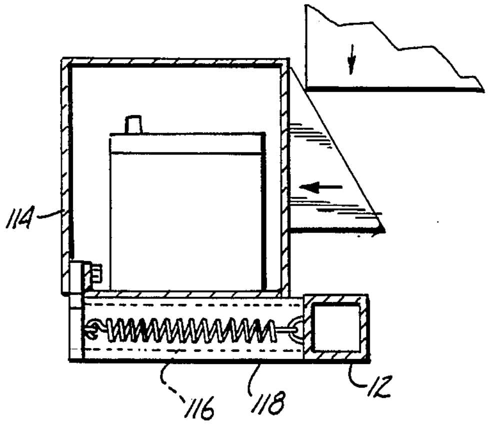
Fig. 11
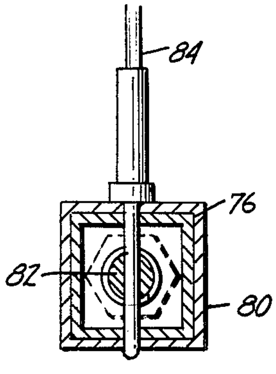
Fig. 10

HIGH/LOW EXTENSION-LIFT POWER WHEELCHAIR

This invention relates to an improvement in a wheelchair to provide better mobility for a person confined to it by reason of physical disability.

There are in the art many forms of self-propelled wheelchairs to allow some increased mobility to a disabled person. However, many disabled persons who may have been physically active before their disability are dissatisfied with wheelchairs presently available.

Thus, it is an important feature of this invention to provide a wheelchair which allows mobility for a handicapped person in the form of allowing traversing uneven terrain as would be encountered in outdoor activities. Also, the occupant of the presently disclosed wheelchair would have available and be able to participate in ground level activities such as gardening, picnics, and playing with small children. Even such routine, to a non-handicapped person, activities such as retrieving a dropped object, may be difficult or impossible for a person confined to a conventional wheelchair. With the wheelchair of the present teaching, all of these ground level activities become readily available to the occupant.

Referring now to the drawings:

FIG. 3 is a schematic representation of the lifting/extension mechanism of this invention, with the seat in the uppermost position;

FIG. 4 is a schematic representation of the lifting/extension mechanism of this invention with the seat in the lowest position;

FIG. 8 is a partial section and view depicting the drive mechanism for one of the independently driven drive wheels;

FIG. 9 is a section view taken along the line and in the direction of the arrows 9—9 of FIG. 8, depicting the mechanism for axially moving the drive wheels relative the wheelchair frame;

FIG. 10 is section view along the line 10—10 and in the direction of the arrows in FIG. 9, depicting the drive mechanism for moving said drive wheels relative the wheelchair frame;

FIG. 11 is a partial section depicting the mechanism for moving out the battery housings as the seat is lowered;

Figure 1:
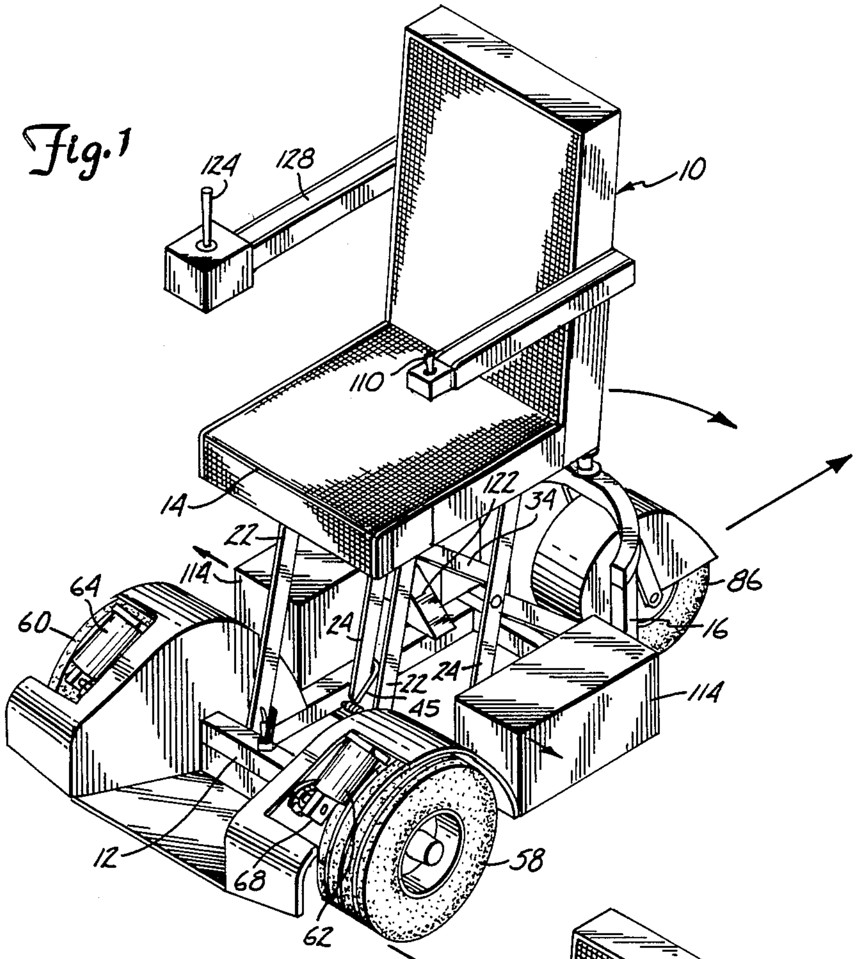
FIG. 1 is a pictorial view of the wheelchair according to this invention, with the seat in the uppermost position.
Figure 2:
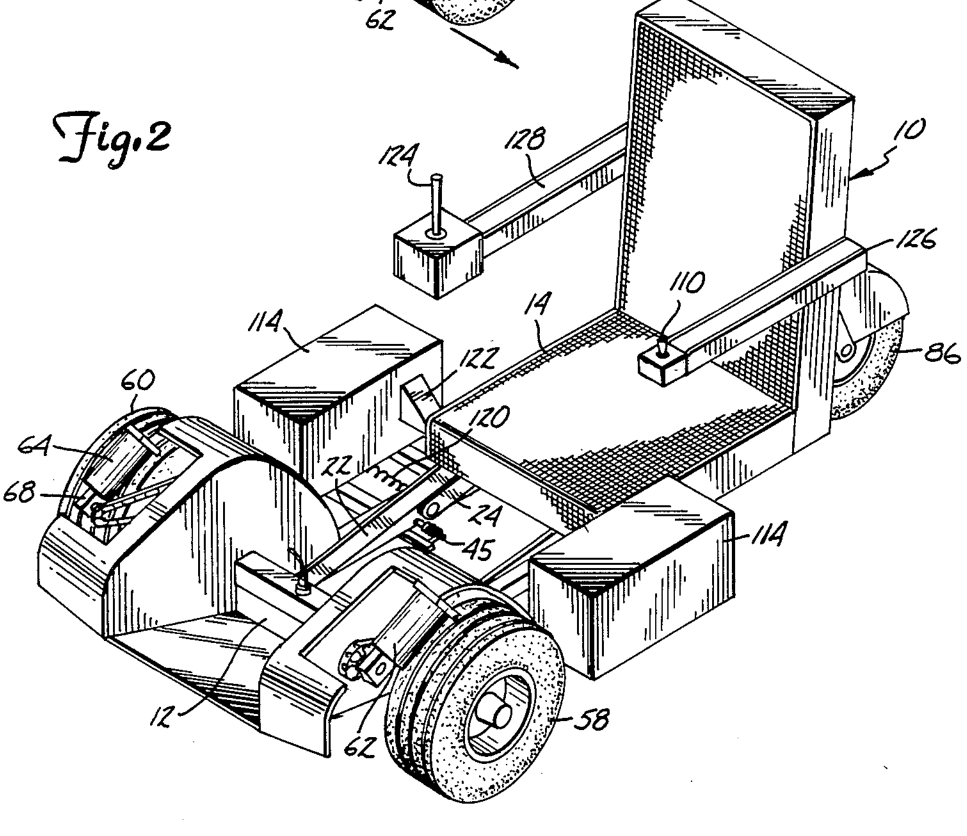
FIG. 2 is a pictorial view of the wheelchair according to this invention with the seat in the lowest position.
Figure 5:
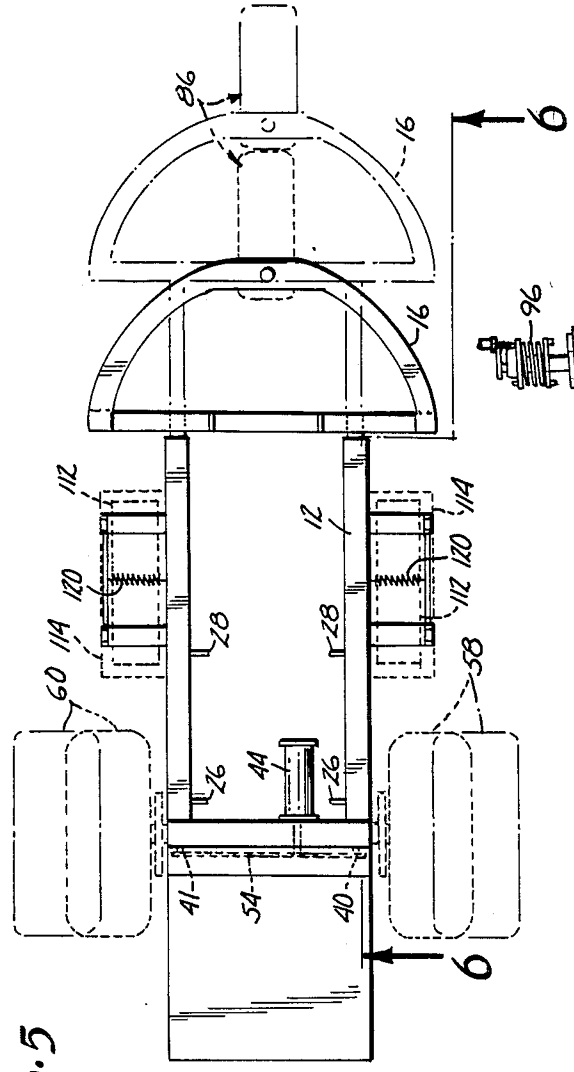
FIG. 5 is a top plan view of the wheelchair frame with solid lines depicting the seat in the uppermost position while the broken lines depict the configuration when the seat is in the lowest position.

In the drawings, the wheelchair 10 is basically comprised of a main frame 12 and a seat member suitably shown as seat 14. An extension structure or extension frame 16 is operably secured to main frame 12. One suitable means for operably securing extension frame 16 to main frame 12 is to telescopically secure extension frame 16 to main frame 12 to provide strength and adjustability. Such a securement is suitably depicted in FIG. 6 where extension frame 16 slides in bearings 18 and 20. Suitable bearings would be Rulon or Oilite slide bearings which give adequate support while substantially reducing sliding friction.

A coupling means is secured to said seat 14, said main frame 12 and to said extension frame 16 in order to extend the extension frame 16 when seat 14 is lowered and to draw the extension frame 16 towards the main frame 12 when seat 14 is raised. One suitable coupling means is depicted best in FIGS. 3 and 4. In these figures, links 22 and 24 are pivotably secured to main frame 12 and to seat 14 at points 26, 28 and 30, 32 respectively. It is obvious that links 22 and 24 cooperate with main frame 12 and seat 14 to form a rigid, adjustable parallelogram structure. Link 34 is provided to connect the parallelogram linkage with extension frame 16. Link 34 is pivotably connected to link 24 at 36 and to extension frame 16 at 38. It will be noted that as seat 14 is lowered from the position depicted in FIG. 3, it will, because of the parallelogram linkage, remain parallel to main frame 12 while extending extension frame 16 away from main frame 12 to the position shown in FIG. 4 through link 34.

Figure 6:
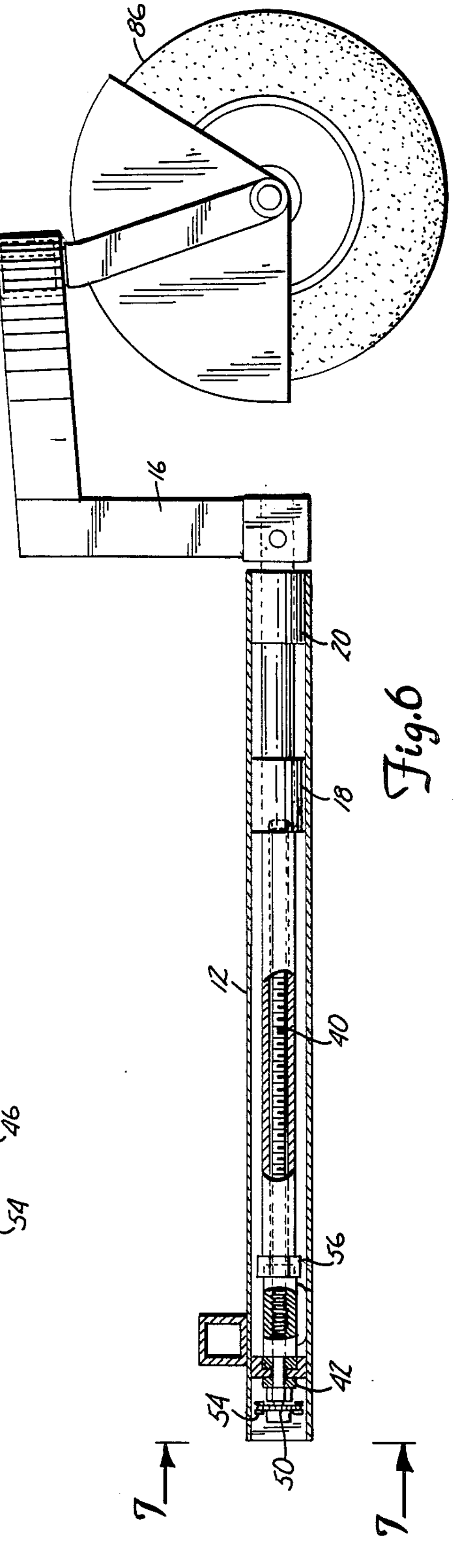
FIG. 6 is a partial section and view along the line and in the direction of the arrows 6—6 in FIG. 5 and depicting the lifting extending mechanism.
Figure 7:
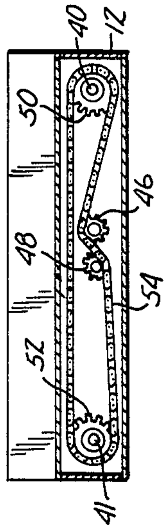
FIG. 7 is a partial section and view along the line and in the direction of 7—7 of FIG. 6, showing the drive mechanism for the seat lift/frame extension.

One suitable means of operating extension frame 16 to raise and lower seat 14 is suitably shown in FIGS. 6 and 7. At least one threaded shaft 40 is rotatably secured to said main frame 12 as by bearings 42. A motor 44 secured to main frame 12 is employed to rotate gear 46 and idler gear 48. Torque from motor 44 is transmitted to threaded shafts 40 and 41 through gears 46 and 48 to gears 50 and 52 via chain 54. A female threaded member as, for example, nut 56 is secured to extension frame 16 and adapted to move along threaded shaft 40 as that member rotates. It is obvious as threaded shaft 40 rotates, nut 56, and thus, extension frame 16 moves relative to main frame 12, raising or lowering seat 14. It is obvious that in lieu of the threaded shaft 40, a hydraulic cylinder may be substituted to move a piston secured to extension frame 16 to accomplish the same end.

It is obvious that when seat 14 is in the lowest position that to lift the weight of an occupant would require a large motor and could conceivably do damage to the frames of wheelchair 10. Consequently, to avoid these problems, a means for counterbalancing the weight of the rider is provided. In this disclosure, this takes the form of a torsion spring 130 acting on link 24. Torsion spring 130 is set so that it is fully loaded when seat 14 is in the lowest position. Thus, as extension frame 16 is started back towards main frame 12, torsion spring 45 urges seat 14 upward, taking some of the load on motor 44.

Two drive wheels are employed in this teaching. They are suitably depicted as drive wheels 58 and 60. Individually controlled motors 62 and 64 are the preferred means for operating drive wheels 58 and 60 respectively. It will be appreciated that very precise, accurate steering is achieved by individually controlled drive wheels 58 and 60 in differential steering. In the mode shown, motor 64 is mounted on axle 80 as by bracket 66.

Torque from motor 64 is transmitted through a right angle gear box 68 to gear 70. Gear 70 drives chain 72 to drive gear 74 secured to wheel 60. The best form of this invention employs drive wheels 58 and 60 with inflatable rubber tires including relatively deep tread to provide enhanced or maximum traction on various surfaces such as snow or dirt.

In the preferred embodiment of this wheelchair, drive wheels 58 and 60 are secured to main frame 12 by telescoping axles as depicted in FIG. 9. In that figure, axles 76 and 78 telescope within axle 80 secured to main frame 12. A lead screw mechanism depicted in FIGS. 9 and 10 shows a lead screw 82 adapted to rotate with drive wheel 58 and which may be selectively engaged as by pushrod 84 to employ the rotation of wheel 58 to drive axle 76 in or out relative axle 80. The control end of pushrod 84 is operably secured to wheelchair 10 in order to allow the occupant to change the width or track of the unit. By increasing the width, the unit is made more stable for outdoor usage on uneven terrain. When the width is decreased, it has more convenient dimensions for use within buildings.

To provide three point stability and support, a free-turning wheel is castered to extension frame 16. This castered wheel 86 has been found to work best and give the most accurate tracking and steering if cambered from 5 degrees to 15 degrees from the vertical.

Figure 12:
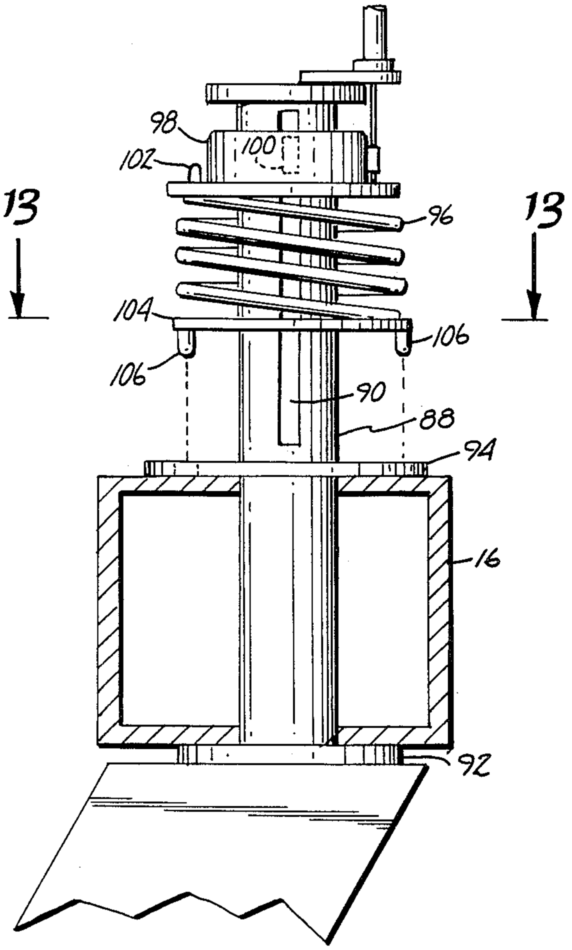
FIG. 12 is a partial section view of the torsion limiter for the rear castered wheel; and, FIG. 13 is a top view along the line and in the direction of the arrows 13—13 of FIG. 12 depicting part of the torsion restricting device.
Figure 13:
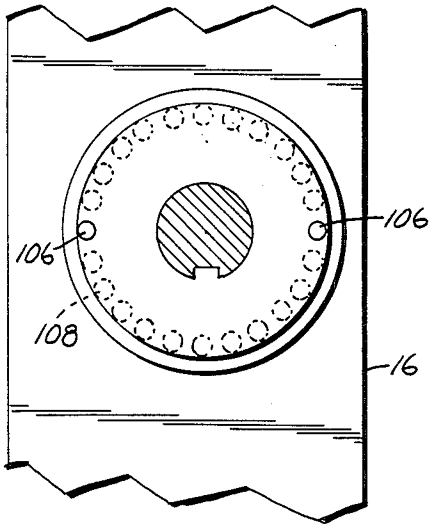

A freely castering wheel could become a liability in outdoor usage in going downhill. Such free-turning wheel could cause lack of control evidenced by various degrees of fishtailing. To prevent this problem, a means for limiting castering of the rear wheel 86 is provided. In the preferred version, this takes the form of the torsion limiter depicted in FIGS. 12 and 13. The rear wheel 86 is rotatably secured to extension frame 16 as by shaft 88. Shaft 88 is provided with a keyway 90. Shaft 88 is fixed to extension frame 16 as by washers 92 and 94 fixed to shaft 88. A torsion spring 96 is slidably secured to shaft 88 as by slide washer 98. Slide washer 98 is prevented from rotating relative shaft 88 by providing a key 100 adapted to mesh with keyway 90. Torsion spring 96 is secured against rotating relative slide washer 98 as by securing spring end 102 to said slide washer 98. The lower end of torsion spring 96 is secured to washer 104. Washer 104 is provided with pegs 106 adapted to selectively mesh with and engage holes 108 in washer 94. A pushrod 110 is provided to push slide washer 98, torsion spring 96, and washer 104 together with pegs 106 into meshing engagement with holes 108 in washer 94. As the pegs 106 engage washer 94, it will be obvious that torsion spring 96 will tend to bias shaft 88 to the position that it was in when engaged. The further that shaft 88 rotates, the greater the biasing force exerted by torsion spring 96 toward the neutral position.

Because the motors employed are electric, provision is made to carry substantial storage batteries. To protect batteries 112, it is desirable to keep them as close to the center of wheelchair 10 as possible. It is obvious, then, that as the seat 14 is lowered, provision must be made to move batteries 112 outward so that seat 14 can be moved close to the ground. A very satisfactory means for accomplishing this is shown in FIG. 11. A battery housing 114 is slidably secured to main frame 12 by shaft 116 telescoping within main frame support shaft 118. Battery housing 114 is biased toward main frame 12 as by spring 120. A cam 112 is secured to battery housing 114 and is adapted to engage seat 14 as that member descends. Seat 14 engaging cam 122 forces battery housing outwardly away from under seat 14 and against the biasing of spring 120. As seat 14 is raised, spring 120 biases battery housing 114 back into position towards the center of wheelchair 10.

A very convenient place to position controls such as the pushrod control 110, and joystick 124 for controlling the drive wheels 58 and 60 is in arms 126 and 128 of seat 14.

To use this chair, a rider would use the joystick 124 to control movements. If the rider decided to engage in an activity at a lower level towards the ground, motor 44 would be activated driving threaded shaft 40 to push nut 56 and extension frame 16 out away from main frame 12. This would cause seat 14 to be lowered through the parallelogram linkage formed by links 22 and 24 and loading torsion spring 45. As seat 14 is lowered, cam 122 engages the bottom of seat 14 and forces battery housing 114 outwardly against the resilient urging of spring 120. To raise seat 14, the process is reversed, and it will become obvious that torsion spring 45 will tend to push link 24 upward to offset and counterbalance the rider's weight. Since the seat 14 is not lifted or lowered in only a vertical direction, but rather, travels in an arc, the rider's legs are in no danger of being caught in the mechanism. Rather, the rider's legs are automatically caused to be extended as the seat lowers.

It will be appreciated that as the seat and rider are raised and brought forward, the center of gravity of the unit moves forward and thus, more over the drive wheels 58 and 60, increasing traction.

In inside usage on level surfaces, it is desirable to keep the wheeltrack as narrow as possible. However, in outside usage, the wider apart the drive wheels are kept, the better, for enhanced stability. Thus, to increase the width of wheeltrack, the rider would activate pushrod 84, engaging lead screw 82. At the same time, the wheelchair 10 would be moved forward, causing drive wheels 58 and 60 to be moved outwardly relative main frame 12, thus increasing stability of the chair on uneven terrain. Pushrod 84 is then released to keep the drive wheels 58 and 60 at the same position. To bring drive wheels 58 and 60 in towards main frame 12, the process is reversed. Pushrod 84 is operated to engage lead screw 82 and the wheelchair 10 is run backward until drive wheels 58 and 60 are in the desired position.

It is obvious that many changes may be made to the mechanisms of this wheelchair without departing from my invention of a highly maneuverable wheelchair providing the occupant with low level accessibility.

I claim:

1. A wheelchair adapted to selectively position the rider in positions of varying height from the ground comprising: a main frame; two drive wheels operably secured to said frame; a seat operably secured to said main frame and adapted to be selectively raised or lowered; an extension structure operably secured to said frame and adapted to selectively move relative to said main frame; coupling means operably secured to said seat, to said main frame, and to said extension structure said coupling means adapted to extend said extension structure relative to said main frame when said seat is lowered and to draw said extension structure towards said main frame when said seat is raised; a wheel operably secured to said extension structure, said wheel adapted to have selectively limited castering and adapted to support said wheelchair as a third point cooperating with said two drive wheels.

2. The wheelchair of claim 1 further characterized by said extension structure being telescopically secured to said main frame.

3. The wheelchair of claim 2 further characterized by said seat being adapted to raise and lower in an arc rather than vertically only.

4. The wheelchair of claim 3 including an extension structure control for selectively raising and lowering said seat at the option of the wheelchair occupant.

5. The wheelchair of claim 4 further characterized by said extension control comprising a selectively operable motor operably secured to at least one screw, said screw being adapted to cooperate with a female thread on the extension structure to move said extension structure relative to said main frame.

6. The wheelchair of claim 5 further characterized by said seat being provided with counterbalancing means for counterbalancing the occupant's weight in order to reduce the load on said selectively operable motor.

7. The wheelchair of claim 6 further characterized by said counterbalancing means comprising at least one torsion spring, which torsion spring is fully loaded when said seat is in the lowest position.

8. The wheelchair of claim 7 further characterized by the drive wheels being rubber-tired wheels and including relatively deep treads for enhanced traction.

9. The wheelchair of claim 8 further characterized by the two drive wheels being independently driven to adapt the wheelchair to a high degree of maneuverability by differential steering.

10. The wheelchair of claim 9 further characterized by said wheel operably secured to said extension structure comprising a free-wheeling wheel castered to said extension frame and including a torsion limiter to selectively limit the amount of travel and swiveling of said castered wheel so as to provide for better and more accurate steering of the wheelchair.

11. The wheelchair of claim 10 further characterized by said castered free-turning wheel being cambered at from 5 to 15 degrees from the vertical to provide enhanced tracking and directional stability.

12. A variable height wheelchair adapted to provide maximum stability, comfort and maneuverability for an occupant, said wheelchair comprising: a main housing; an extension frame telescopically operably secured to said main housing; drive means for propelling said wheelchair; support means adapted to cooperate with said drive means to support said wheelchair; a seat member operably secured to said main housing and adapted to seat the occupant of the wheelchair; power means secured to said main housing for moving said extension frame relative to said main housing for raising and lowering said seat member relative to said main housing; connecting means comprising a parallelogram linkage structure of two parallel links, pivotably secured to said main housing and to said seat member, and a link adapted to be operably secured to one of said parallel links and to said extension frame for selectively raising and lowering said seat member, said parallelogram linkage structure being adapted to extend said extension frame from said main housing when said seat member is lowered and to draw said extension toward said main housing when said seat is raised; and, counterbalance means secured to said connecting means and adapted to compensate for the weight of the occupant of the wheelchair.

13. The wheelchair of claim 12 further characterized by said counterbalance means comprising at least one torsion spring and adapted to be fully loaded when said seat member is in the lowest position.

14. The wheelchair of claim 13 further characterized by said drive means comprising at least two independently driven wheels operably secured to said main housing and adapted to be individually driven and controlled.

15. The wheelchair of claim 14 further characterized by said support means comprising a free-turning wheel castered to said extension frame and adapted to have selectively limited castering so as to achieve a high degree of control of the steering of said wheelchair on uneven terrain.

16. The wheelchair of claim 15 further characterized by said independently driven wheels comprising rubber-tired wheels with relatively deep tread to ensure maximum traction on various terrain.

17. The wheelchair of claim 16 further characterized by said power means comprising a motor adapted to selectively drive at least one screw in a female threaded member secured to said extension frame to move said extension frame relative to said main housing.

* * * * *